United States Patent [19]

Harvey et al.

[11] Patent Number: 5,337,513
[45] Date of Patent: Aug. 16, 1994

[54] SNAIL AND SLUG DETERRENT BARRIER

[75] Inventors: Larry Harvey, Palos Verdes Estates; William Sheaffer, Santa Ana; Robert Staniec, Playa del Rey; Malcolm McLean, Los Angeles, all of Calif.

[73] Assignee: Harvey Universal, Inc., Torrance, Calif.

[21] Appl. No.: 930,748

[22] Filed: Aug. 14, 1992

[51] Int. Cl.⁵ .............................................. A01M 1/00
[52] U.S. Cl. ..................................... 43/124; 43/108
[58] Field of Search ................... 43/107, 108, 121, 124

[56] References Cited

U.S. PATENT DOCUMENTS

| | | | |
|---|---|---|---|
| 413,507 | 10/1889 | Halstead | 43/107 |
| 4,241,532 | 12/1980 | Fancy | 43/112 |
| 4,471,561 | 9/1984 | Lapierre | 43/108 |
| 4,471,562 | 9/1984 | Brucker | 43/108 |
| 4,747,229 | 5/1988 | Chambers | 43/112 |
| 4,756,116 | 7/1988 | Cutter | 43/112 |
| 4,826,685 | 5/1989 | Stewart | 43/114 |
| 5,175,959 | 1/1993 | Scholnick | 43/124 |

FOREIGN PATENT DOCUMENTS

| | | | |
|---|---|---|---|
| 0039002 | 4/1981 | Japan | 43/124 |
| 0142203 | 11/1981 | Japan | 43/124 |
| 0056910 | 4/1985 | Japan | 43/124 |
| 3126447 | 5/1988 | Japan | 43/121 |

Primary Examiner—Kurt C. Rowan
Assistant Examiner—James Miner
Attorney, Agent, or Firm—Karen S. Perkins

[57] ABSTRACT

The invention comprises a physical barrier which deters the entrance of snails and slugs into an enclosed area. In preferred embodiments, the barrier is a treated rigid edging (such as fencing, or benderboard of wood or plastic) or a treated flexible edging (such as a tape). The edging material has an exposed surface (e.g., at or above the soil level) which includes a particulate copper material in a polymeric matrix.

5 Claims, 4 Drawing Sheets ated gastropods, such as snails and slugs, consume foliage and are a major cause of plant damage, both in agriculture and in home gardens. Conventional techniques for controlling snails and slugs include picking the pests from foliage by hand, the use of toxic snail baits, and electrical elimination methods.

SNAIL AND SLUG DETERRENT BARRIER

TECHNICAL FIELD

This invention relates generally to pest control, and more particularly to a barrier device for snails, slugs, and the like.

BACKGROUND OF THE INVENTION

Terrestrial gastropods, such as snails and slugs, consume foliage and are a major cause of plant damage, both in agriculture and in home gardens. Conventional techniques for controlling snails and slugs include picking the pests from foliage by hand, the use of toxic snail baits, and electrical elimination methods.

Picking of snails and slugs from foliage is most effective when done at night or in the early morning hours, as these pests are nocturnal foragers and spend daylight hours in concealment. Hand picking of snails or slugs from foliage is usually accompanied by physical destruction of the pests. The collection of the pests, and the particulars of their subsequent destruction, are distinctly unpleasant to many persons.

Toxic snail baits are available. However, many toxic snail baits are not recommended for use around vegetable or fruit crops. Even those toxic snail baits which are safe around food crops remain effective for only a limited period of time. Regular applications of toxic baits are generally needed to protect plants in a given area.

All toxic snail baits have undesirable features. The use of toxic snail baits may be inadvisable in areas where small children or animals have access to the poison. In addition, many people are adverse to the deliberate spread of toxins into the environment.

Various forms of electrical barriers have been developed for the purpose of repelling or eliminating insects and animals from an area that is to be protected, or in the case of insects in particular, for the purpose of extermination. These prior systems are not particularly adaptable to the easy control of snails and slugs. Such systems require an external source of electrical power such as a battery, or use connections to utility power lines and continuously consume electrical energy. Such systems also tend to be complex, costly, and require a significant amount of maintenance effort.

Aquatic mollusks, crustaceans, and algae pose a problem for freshwater and marine vessels, as well as for other structures which exist in aquatic environments. Biocidal paints and coatings are used on aquatic vessels to minimize the encroachment of flora and fauna onto the surfaces of, for example, boats, piers, power plants and desalinization plants. Aquatic biocidal paints generally function by leaching small amounts of noxious chemicals into the water surrounding the treated surface.

SUMMARY OF THE INVENTION

A particulate copper metal which is held in a polymeric matrix acts as a physical barrier for the repulsion of terrestrial gastropods, including snails and slugs. This polymeric copper matrix barrier does not kill the animals, but merely provides a deterrent to travel in the direction of the barrier. By using a barrier of this invention, a specific area can be bordered to keep terrestrial gastropods either within or without the border.

A particulate copper metal is present in a polymer material, generally in a concentration of from about 5 to about 95 weight percent particulate copper, and from about 95 to about 5 weight percent polymer matrix. The particulate copper is dispersed fairly evenly within the polymer material.

The polymeric copper matrix can be provided on a variety of rigid substrates, such as benderboard and other borders for agricultural applications. The polymeric copper matrix can be provided on a flexible or tape-like backing, and especially an adhesive backing, for use on or around planters, pots, stakes, and the like. The polymeric copper matrix can be provided as sheets which are manufactured or can be cut to a desired size and shape. Finally, the polymeric copper matrix can be provided in liquid form, for application to existing fences or other structures. This liquid dries to form the desired border material.

BRIEF DESCRIPTION OF THE DRAWINGS

The Figures are drawn for clarity and are not drawn to scale. Similar numbers refer to similar structures throughout the Figures.

DISCLOSURE OF THE INVENTION INCLUDING BEST MODE

Figure 1:
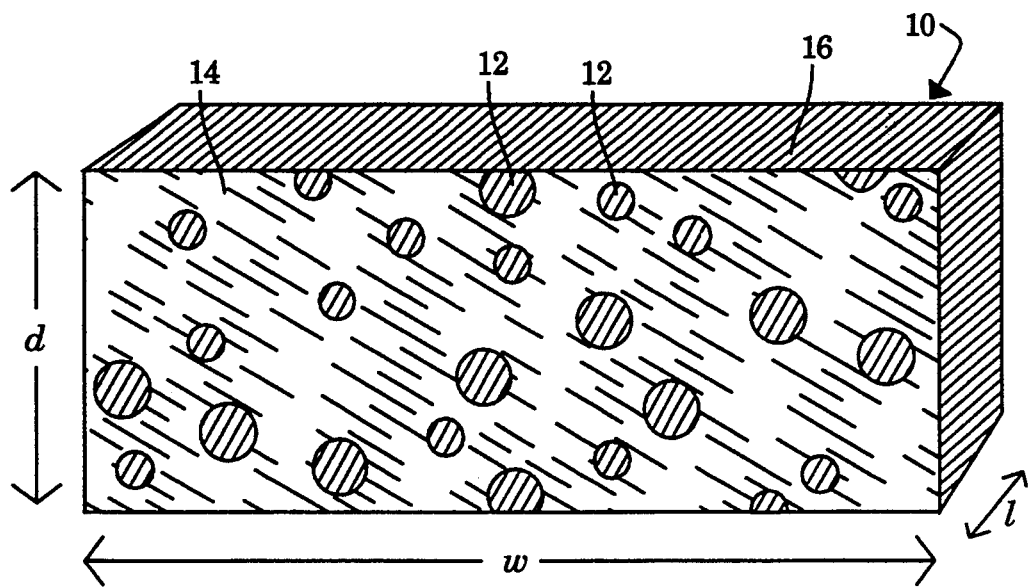
FIG. 1 shows a representational cross-sectional view through a polymeric copper matrix, showing the distribution of particulate copper 12 through the polymeric matrix 14.

The polymeric copper matrix material of this invention is used to deter terrestrial animals having a copper-based blood. The polymeric copper matrix is especially effective in deterring slow-moving terrestrial gastropods which produce a slime layer, such as snails and slugs. Termites and other wood-boring insects are also deterred by the polymeric copper matrix material. However, for ease of reference, and not by way of limitation, the invention will be described in terms of a barrier for snails and slugs.

With the use of this invention, snails and slugs can be largely excluded from home gardens or large-scale agricultural plots. An unbroken border of snail and slug deterring barrier is used to define a perimeter across which snails and slugs are to be excluded. The border is conveniently provided along the ground, which is the usual path for snails and slug immigration into agricultural areas. Individual trees and other foliage having fronds which overlap a ground border may be individually protected, if desired, to minimize snail and slug immigration using the foliage as a pathway. When individual plants are to be protected, a border can be established either outside a planting container, or on the trunk of the plant itself. The snails and slugs which are within the border are removed, either by hand picking or by using toxic materials. Snails and slugs will not pass the deterrent border, and immigration into the area will be severely curtailed.

In agricultural areas, the snail and slug deterrent border can be established prior to the planting of crops. A fallow field can be bordered with the border material, then hand-picked to remove snail and slugs, or baited with toxics. Seeds or seedlings can be planted after the snail-free zone is established.

Most home gardens are not left fallow for extended periods of time. In these areas, a perimeter of snail deterrent border can be established, followed by snail and slug eradication within the area. Care should be taken to minimize the influx of new snails or slugs from overhanging foliage.

Because snails and slugs can encroach into an agricultural area through paths other than crossing the ground (e.g., by being dropped by birds, by falling from adjoining foliage, and the like), it may be necessary to handpick snails and slugs from a protected area, or to use snail bait, on an occasional basis. By minimizing the potential for immigration, the effective use of the snail and slug border can minimize or eliminate the need for such tactics.

A border of the polymeric copper matrix material on a surface of the planter will provide protection against the incursion of snails and slugs into potted plants. A border of the polymeric copper matrix on an outer surface of a dish will keep snails and slugs from infesting food and water sources which are left outside for pets or wildlife, without harming the pets or wildlife.

Because the barrier does not kill or injure the snails or slugs, the polymeric copper matrix can be used as a border for areas which contain snails for harvesting, for example for use as food (escargot), research, or other purposes. The border material merely corrals the terrestrial gastropods and contains them within a proscribed area, but does not adversely affect the animals.

FIG. 1 shows a representational cross-sectional view of a polymeric copper matrix 10 of this invention. Copper particles 12 are evenly suspended in a polymeric material 14. At least one exposed surface 16 is presented to act as a border to terrestrial snails and slugs.

Unlike biocidal paints, snail toxins, and electrical snail eradicators, the polymeric copper matrix 10 does not kill the snails which come into contact with it. Rather, the snails are merely repulsed by the chemical properties of the polymeric copper matrix 10. The precise reason snails and slugs find the polymeric copper barrier material offensive is not clear. It is possible that the "taste" of the copper metal is offensive to the snails, causing them to avoid it. It is also possible that, by readily transferring electrons from the particulate copper to the snail or slug, a non-lethal electrical "shock" stimulation is given. It is possible that the copper-uptake processes by which snails and slugs incorporate copper into their diet are "overloaded" by the copper in the polymeric copper matrix. Mammals and birds, which have iron-based blood, are not inhibited by the edging.

The exposed surface 16 of the polymeric copper matrix 10 can be provided in a strip having a specific length, l, width, w, and depth, d. The length, l, of the strip will vary with the substrate and application used. Various embodiments are discussed below. Preferably, the width, w, of the exposed surface 16 of the polymeric copper matrix 10 is at least as wide as the snails and slugs found in the environment. This precludes a snail or slug from "bridging" the strip with its body to cross the border. The depth, d, of the polymeric copper matrix 10 can vary with the application and the desired length of effective use the border will demonstrate. Generally, a depth, d, of the polymeric copper matrix 10 will be at least 25 millimeters.

The polymeric copper matrix 10 consists of copper particles 12 suspended in a polymeric material 14. The copper particles 12 are metallic copper. The copper particles 12 can be, for example, flaked, chipped, slivered, powdered, or the like, to form units having a small volume of metallic copper and a relatively large surface area.

The particulate copper metal is present in the polymer material, generally in a concentration of from about 5 to about 95 weight percent particulate copper, and from about 95 to about 5 weight percent polymer matrix. Preferably, the particulate copper metal is present in the polymer material in a concentration of from about 20 to about 95 weight percent particulate copper, and from about 80 to about 5 weight percent polymer matrix. More preferably, the particulate copper metal is present in the polymer material in a concentration of from about 20 to about 30 weight percent particulate copper, with the balance being polymer matrix.

The particulate copper 12 will normally include a distribution of copper particle sizes. Generally, the copper particles 12 will pass through a 100 mesh screen or finer. Preferably, the copper particles 12 pass through a 325 mesh screen. More preferably, the copper particles 12 pass through an 800 mesh or finer screen. It is believed that the copper within the polymeric matrix which is exposed at the surface of the polymeric matrix acts as the snail and slug deterrent. In general, when finer size copper particles are present, the barrier is effective at lower weight percent copper concentrations. When larger copper particles are present, a larger weight percent of copper must be used to provide an effective snail and slug deterrent barrier.

A wide range of particulate copper metals and alloys are available. Generally, the particulate copper metal is at least 90% copper by weight. Preferably, the copper metal is at least 95% copper by weight. More preferably, the copper metal is at least 99% copper by weight. Copper particles having a 99.5% purity and a mesh size of 325 or 800 are each available from Alcan (New Jersey).

Upon long-term atmospheric exposure, the metallic copper is corroded to a green hydrated basic copper carbonate $(Cu_2(OH)_2CO_3)$, often called verdegris. Verdegris is not an effective deterrent for snails and slugs. The corrosion of the copper by the atmosphere limits the effective life of the polymeric copper matrix. Therefore, in a preferred embodiment, the polymeric copper matrix is slowly ablated by normal wear, so that verdegris is removed as it is formed and fresh copper is exposed. "Self-polishing" slowly ablative matrices provide a longer functional life for the polymeric copper matrix, and thus a longer effective life as a snail barrier.

The specific polymeric material 14 which is used to provide the matrix can vary with the specific application of the snail and slug barrier. Generally, the polymeric material 14 must withstand normal wear for the environment of use. The polymer is preferably resistant to corrosion by sunlight, water, agricultural chemicals, and the temperature extremes encountered in normal terrestrial environments.

In a preferred embodiment when the polymeric copper matrix 10 completely covers an underlying structure, the polymeric copper matrix 10 provides protection to the underlying structure. For example, the exposed surfaces of wooden or polymeric benderboard can be coated with a polymeric copper matrix 10 of this invention. Preferably, the polymeric copper matrix 10 helps protect the coated benderboard from degradation by sunlight, water, chemicals, or temperature.

A variety of known non-toxic, water-insoluble polymeric materials 14 can be used to provide the matrix. When a rigid matrix is preferred, polymers such as those currently used in construction of agricultural edging or equipment are generally preferred. For example, polypropylenes, polyesters, polyurethane, polybenzimidazole, polycarbonate, polyester resins, high-density polyethylenes, polystyrenes, polyurethanes, polyvinyl derivatives, other rigid plastics, and combinations thereof, can be used. When a more flexible matrix is preferred, polymers such as ethylcellulose, polyimides, polybutylenes, low-density polyethylenes, polypropylenes, polyurethanes, polyvinyl chloride (PVC), polyamide, polyesters, polystyrenes, polymethyl methacrylate, other flexible plastics, and combinations thereof, can be used. Especially preferred polymeric materials include slowly ablative polymers such as polyurethanes, polyvinyl chloride, ethylcellulose, and the like. In a preferred embodiment, the polymeric matrix material is slowly ablative, so that fresh copper surfaces are exposed over time. Preferred ablative polymers include oil modified polyurethanes and ethylcellulose.

Additional materials can be added to the polymer copper material as desired. For example, antioxidants, stabilizers, fillers, pigments, plasticizers, and the like, can be added.

Generally, the polymeric matrix and the particulate copper are combined, and the particulate copper is well mixed into the polymeric matrix. If a barrier strip or film is to be made, the material is extruded or otherwise formed into the desired shape.

Figure 2:
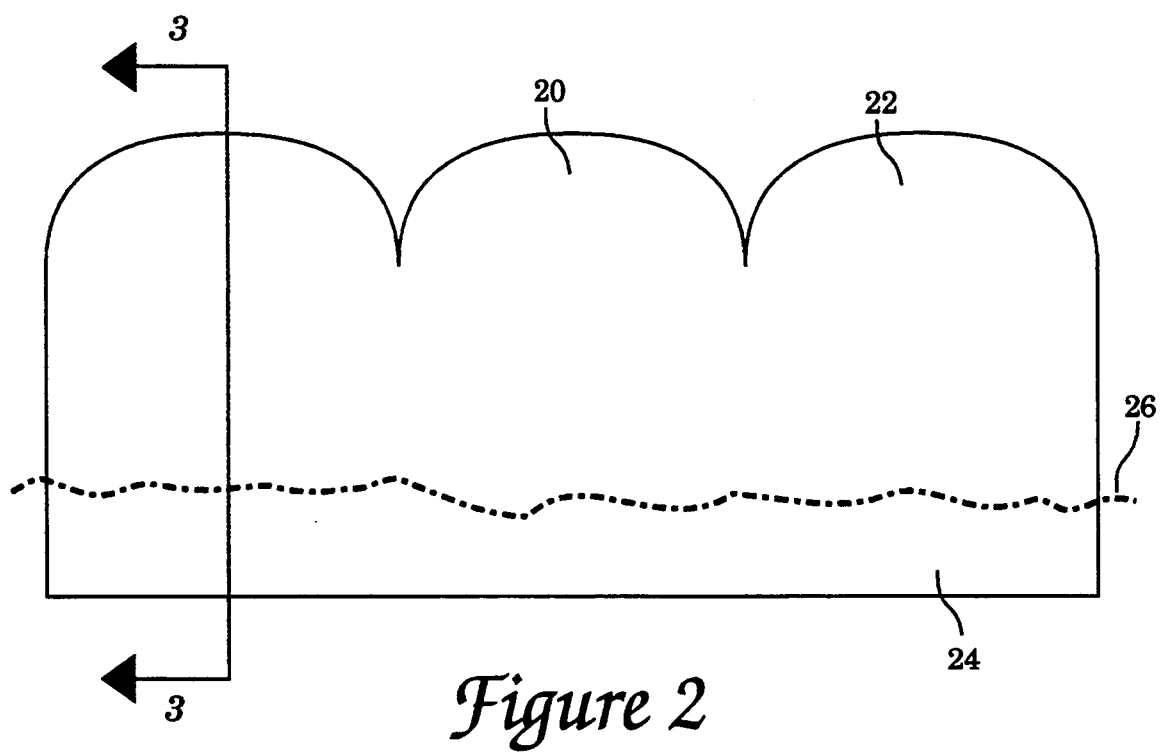
FIG. 2 shows a garden border 20 including the snail border material.

FIG. 2 shows a strip of rigid agricultural edging 20. A wide range of agricultural edging 20 is known and used for a variety of functional and decorative purposes. Generally, agricultural edging includes an upper area 22 which is exposed to the atmosphere, and a lower area 24 which is below ground level 26 and which holds the edging in position.

The agricultural edging 20 shown includes a scalloped upper edge which is common for use in gardens. A wide variety of agricultural edging 20 is available. They are commonly made of concrete, polyvinyl chloride, polyethylene, fiberglass, cross-cut logs, bendable strips of wood or polymer (benderboard), laminates, and the like. For purposes of simplicity, and not as a limitation, the agricultural edging 20 will be discussed with reference to a polyethylene benderboard.

When a snail and slug barrier material is provided on a rigid or semi-rigid substrate to form agricultural edging 20, the barrier extends from one end of the substrate to the opposite end. Individual units, for example of benderboard, are aligned or laid end-to-end to provide a contiguous snail deterrent border. The benderboard can be somewhat overlapped at the ends to ensure that no path exists which would permit the movement of snails and slugs across the border.

FIGS. 3a–f show several embodiments of the agricultural barrier of FIG. 2, taken in cross-section through line 3—3.

Figure 3C:
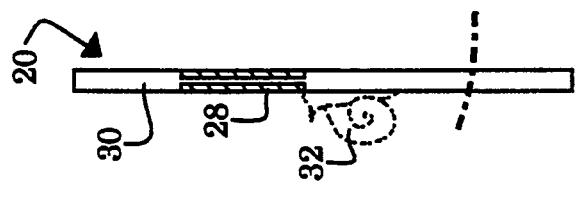
FIGS. 3a through 3f illustrate alternate cross-sectional views of the garden border of FIG. 2, showing various embodiments of the barrier material 28 in conjunction with a rigid substrate 30.
Figure 3B:
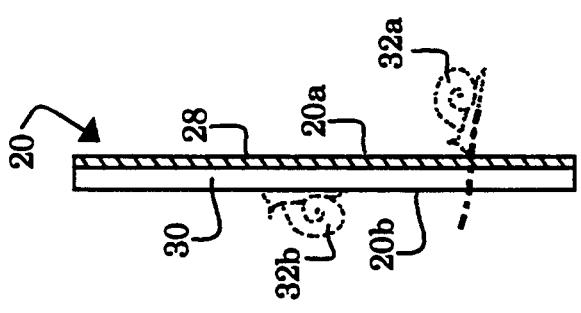
Figure 3A:
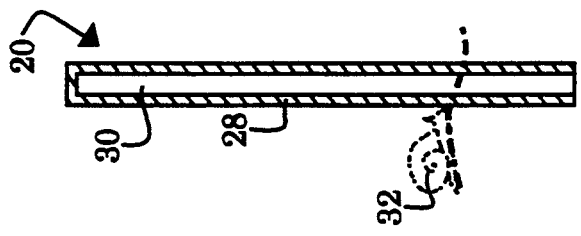

FIG. 3a shows one cross-sectional embodiment of the agricultural edging 20 of FIG. 2, taken through line 3—3. In the pictured embodiment, all exposed surfaces of the agricultural edging 20 present snail and slug barrier material 28 which acts to deter terrestrial snails 32 and slugs. The rigid or bendable support 30 is coated completely with the barrier material 28. Snails 32 and slugs will not climb the barrier, and thus will not pass the perimeter of the enclosed area.

This embodiment is a preferred embodiment, as the barrier material 28 can be coated onto the support 30 during the manufacture of the support 30, and provides for ease of manufacture. For example, a polyethylene benderboard can be molded or extruded. A polyethylene matrix which includes the particulated copper of this invention can be molded or extruded to surround the benderboard at the time of manufacture. Because the support 30 and the barrier material 28 each have a polyethylene base, separation of the layers and cracking due to thermal or other wear factors is minimized. Alternatively, the barrier material can be provided as a coating which is added subsequent to the manufacture of the benderboard. The coating can be in the form of a strip, a sheet, or a liquid, which is placed and secured as desired.

This embodiment is also preferred because the agricultural edging 20 can be installed in any desired orientation and it will still provide a ground-level barrier to the passage of snails 32 and slugs.

The barrier material 28 which coats the support 30 can be provided in any desired thickness. Generally, the cost of the barrier material 28 will be greater than that of the support 30, so that a thinner coating is preferred for economic reasons.

FIG. 3b shows an alternate cross-sectional embodiment of the agricultural edging 20 of FIG. 2, taken through line 3—3. In the pictured embodiment, one lateral surface of the agricultural edging 20 present snail and slug barrier material 28.

This embodiment is less preferred because the agricultural edging 20 is "directional", i.e., the treated face 20a is an effective snail and slug barrier, while the untreated face 20b is not. Care must be taken to apply the agricultural edging 20 in a proper orientation, and to abut treated faces so that there is no path for snails 32 and slugs to pass. This can be facilitated, for example, by making the barrier material 28 a different color or texture than the support 30, so that the strips of barrier material can be aligned and abutted visually.

As shown, a snail 32 or slug encountering the treated face 20a will avoid it. A snail 32 or slug encountering the untreated face 20b will not be deterred from climbing the border. In a preferred embodiment when one face is left untreated (not shown), the top surface of the agricultural edging 20 includes barrier material, so that snails and slugs do not travel across the top of the agricultural barrier.

FIG. 3c shows yet another embodiment of the agricultural edging 20 of FIG. 2, taken through line 3—3. In the pictured embodiment, each lateral face of the agricultural edging 20 includes a longitudinal stripe of snail and slug barrier material 28 which is integrated into the rigid or bendable support 30. Snails 32 and slugs will climb the edging up to the point the barrier material is encountered. They will avoid the longitudinal stripe of barrier material 28, and thus will not pass the perimeter of the enclosed area.

This embodiment is somewhat less preferred because the agricultural edging 20 is somewhat "directional". Care must be taken to apply the agricultural edging 20 in a proper orientation, and to abut the barrier material strips so that there is no path for snails 32 and slugs to pass. This can be facilitated, as discussed above, by making the barrier material 28 a different color or texture than the support 30, so that the strips of barrier material 28 can be aligned and abutted visually. As shown, a snail 32 or slug encountering the strip of barrier material 28 will avoid it. A snail 32 or slug encountering the support 30 will not be deterred from climbing until it encounters the strip of barrier material 28.

This barrier material 28 can be provided as an integral portion of the support 30 during the manufacture of the support 30. For example, a polyethylene benderboard can be molded or extruded. A polyethylene matrix which includes the particulated copper of this invention can be molded or extruded as a longitudinal strip formed on or attached to the surface the benderboard. Because the support 30 and the barrier material 28 each have a polyethylene base, separation of the layers and cracking due to thermal or other wear factors is minimized. Alternatively, the barrier material 28 can be provided as a coating which is added subsequent to the manufacture of the benderboard.

Figure 3F:
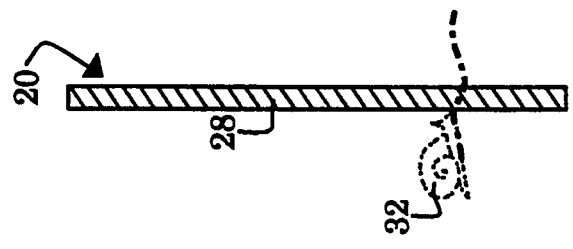
Figure 3E:
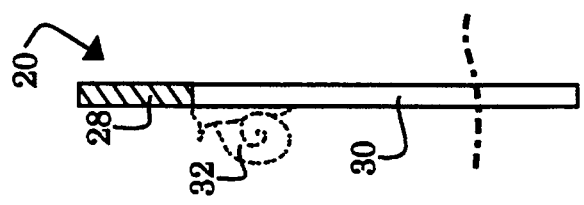
Figure 3D:
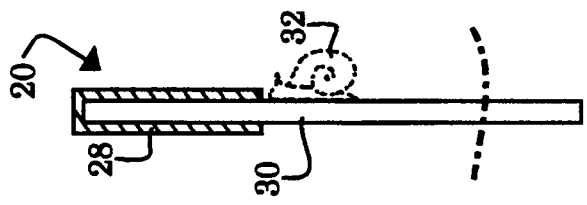

FIGS. 3d and 3e each show similar embodiment of the agricultural edging 20 of FIG. 2, taken through line 3—3. In the pictured embodiments, the upper regions of the agricultural edging 20 includes a longitudinal stripe of snail and slug barrier material 28. In FIG. 3d, the barrier material 28 is a coating which is applied to the surface of the support 30 or which is processed to form a surface treatment for the support 30. In contrast, FIG. 3e shows an agricultural barrier 20 which is made of two separate segments: the barrier material 28 which is present at the exposed end, and the untreated support 30, which is present at the opposite end.

Snails 32 and slugs will climb the edging up to the point the barrier material is encountered. They will avoid the area of barrier material 28, and thus will not pass the perimeter of the enclosed area.

The agricultural edging 20 shown is somewhat "directional". Care must be taken to apply the agricultural edging 20 in a proper orientation, and to abut the barrier material strips so that there is no path for snails 32 and slugs to pass. This can be facilitated, as discussed, by making the barrier material 28 a different color or texture than the support 30, so that the strips of barrier material 28 can be aligned and abutted visually.

The barrier material 28 of FIG. 3d can be provided as an integral portion of the support 30 during the manufacture of the support 30. For example, a polyethylene benderboard can be molded or extruded. A polyethylene matrix which includes the particulated copper of this invention can be molded or extruded to integrate in a longitudinal strip at the uppermost surface of the benderboard. Alternately, the barrier material 28 and the support 30 can each be manufactured separately and joined with, for example, an appropriate glue or physical joining method. The barrier material 28 can be provided as a liquid coating or solid strip which is added subsequent to the manufacture of the benderboard.

The barrier material 28 of FIG. 3e can be provided as an integral portion of the support 30 during the manufacture of the support 30. For example, a polyethylene benderboard can be molded or extruded. A polyethylene matrix which includes the particulated copper of this invention can be molded or extruded to integrate in a longitudinal strip at the uppermost edge of the benderboard. Alternately, the barrier material 28 and the support 30 can each be manufactured separately and joined with, for example, an appropriate glue or other physical joining method.

FIG. 3f shows a cross-sectional embodiment of the agricultural edging 20 of FIG. 2, taken through line 3—3. In the pictured embodiment, the agricultural edging 20 is made completely of a snail and slug barrier material 28 which acts to deter terrestrial snails 32 and slugs. Snails 32 and slugs will not climb the barrier, and thus will not pass the perimeter of the enclosed area. This embodiment is a preferred embodiment. While this can be more expensive than surface treatments, it provides a non-directional barrier with excellent snail and slug deterrence properties.

It may be desirable to provide existing structures or plants with a snail and slug border. Such borders can be provided, for example, using a film of barrier material which is cut (preferably using simple household implements such as shears) to fit the desired parameters of the border. Conveniently, strips of the barrier material can be provided in any desired lengths. If desired, such strips can be rolled for transport, and unrolled before use. A variety of widths from one to three inches will provide effective borders which restrict the travels of most terrestrial gastropods. Such films and strips can be adhered in place using glue, tacks, or other attachment means. Conveniently, the films and strips are provided with a backing adhesive which is resistant to wear. In yet another embodiment, the snail and slug border can be provided in a liquid medium which includes volatile elements. The liquid form of the barrier provides an effective barrier after the evaporation of the volatile elements and the curing of the coating.

Figure 4:
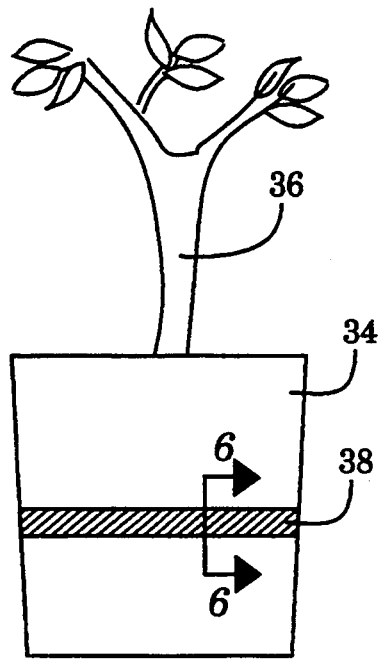
FIG. 4 shows the use of a flexible snail and slug border 20 used on a planter structure.
Figure 5:
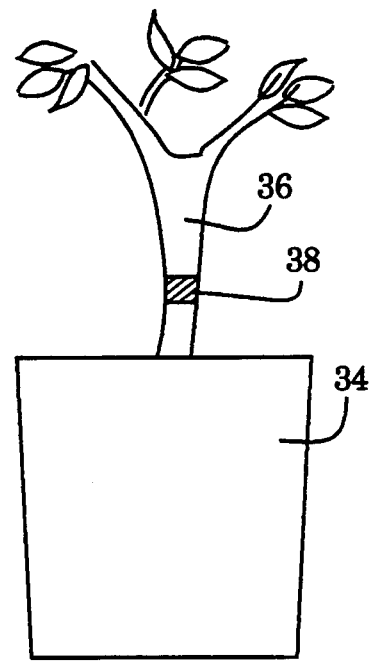
FIG. 5 shows the use of a flexible snail and slug border 20 directly on the trunk of a plant.

FIGS. 4 and 5 show the use of strips of the barrier material to protect a plant with a planter.

FIG. 4 shows a planter 34 which houses a plant 36. A barrier material strip 38 extends around the planter, and deters snails and slugs from traveling from the surrounding ground to the enclosed plant 36. The barrier material strip 38 can be fixed in position using, for example, an appropriate adhesive, staples, brads or nails, and the like.

The barrier material strip 38 can be provided as a sheet which is then cut to fit the contours of the particular planter 34. Preferably, the barrier material strip 38 is provided in the form of a strip having a self-adhesive backing. If the adhesive is not adhered to the polymer matrix, it can be provided in a roll such as that used in common household adhesives. Alternatively, the adhesive backing can be provided with a peel-off backing which protects the adhesive layer prior to final placement of the barrier material strip 38.

FIG. 5 shows a planter 34 which houses a plant 36. A barrier material strip 38 extends around the trunk of the plant 36 itself. The barrier deters snails and slugs from traveling from the ground enclosed within the planter 34 to the foliage of the plant 36.

When barrier material 38 is used to protect an unchanging structure, such as shown in FIG. 4, the barrier material 38 can be fairly rigid. When barrier material 38 is used to protect a changing structure, such as the growing tree shown in FIG. 5, the barrier material 38 is preferably relatively soft and yielding. The polymer used can be selected to expand with the growth of the plant 36.

Figure 6:
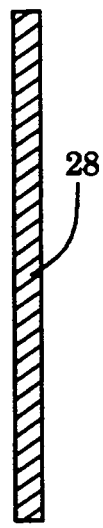
FIG. 6 shows a cross-sectional view of the border of FIG. 4, showing a strip of barrier material 28.

FIG. 6 shows a cross-sectional view of a barrier strip 38 such as that shown in FIG. 4, taken through line 6—6. The barrier material 38 comprises a polymeric copper matrix material 28. It can be provided as a sheet (not shown) or as a strip (shown).

Figure 7:
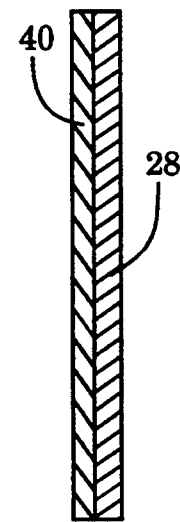
FIG. 7 shows a cross-sectional view of the border of FIG. 4, showing an adhesive-backed strip of barrier material 28.

FIG. 7 shows an alternate cross-sectional view of a barrier strip 38 such as that shown in FIG. 4, taken through line 6—6. The barrier material 38 comprises a polymeric copper matrix material 28 which includes an adhesive backing 40. The adhesive backing 40 preferably is weather-resistant. A peel-off backing (not shown) can be used to protect the adhesive prior to its ultimate emplacement. The barrier material 38 can be provided as a sheet (not shown) or as a strip (shown).

In one embodiment, a snail and slug barrier material is provided as a liquid suspension which includes one or more liquid components. The liquid suspension is kept in a sealed container until it is to be placed onto an appropriate surface. It is preferably agitated prior to application, to ensure the even distribution of suspended materials. The liquid suspension is applied, for example using a paint brush, roller, spray gun, or the like. The liquid components are removed upon exposure to the atmosphere, and a solid polymeric copper matrix remains.

Suspended liquid formulations of the snail and slug polymeric copper border include a drying oil, synthetic resin, or other film-forming component (i.e., a binder), together with a liquid phase. The particulate copper is generally dispersed into the binder and/or the liquid phase. The polymer matrix can be dissolved or dispersed into the binder or the liquid phase. Alternatively, the polymer can comprise the liquid phase. A variety of appropriate liquid phases are known and can be used in conjunction with a polymeric matrix-forming material and particulate copper.

Suspended liquid formulations containing particulate copper have been used in marine anti-fouling paint, such as Sankai Copper No. 5501 (Sankai Chemical Co., Ltd., Tokyo, Japan). Marine paints generally function by eluting copper ions into the aqueous environment, and act as biocidal agents. Unlike marine paints, the polymeric copper matrix herein does not function by eluting copper ions into an aqueous environment, and is not a biocide. However, some marine paints, such as Sankai Copper No. 5501 (Sankai Chemical Co., Ltd., Tokyo, Japan), can find terrestrial use as a polymeric matrix barrier material of this invention. Such marine paints are generally less preferred because they include materials which are specific to aqueous environments, have a limited life in such environments (generally less than 2 years), and tend to be more complex and expensive than the simpler formulations herein.

A preferred formulation of the liquid polymeric copper matrix includes from about 10 wt. % to about 50 wt. % of one or more polymeric resins; and from about 20 wt. % to about 50 wt. % of one or more liquid phase solvents. From about 10 wt. % to about 80 wt. % of particulate copper is suspended in the liquid formulation. A variety of plasticizers, binders, fillers, dispersing agents, and the like are known to the art and can be used. Upon drying or curing, the preferred polymeric copper matrix should include a concentration of from about 20 to about 80 weight percent particulate copper, and from about 20 to about 80 weight percent polymeric material. Upon drying or curing, a more preferred polymeric copper matrix includes a concentration of from about 20 to about 30 weight percent particulate copper, and from about 80 to about 70 weight percent polymeric material. The particulate copper should be dispersed fairly evenly within the polymer material.

The liquid polymeric copper matrix should be thoroughly mixed (to disperse the copper particles), and then applied to a clean, dry, smooth surface. More than one coat may be used to provide the desired coating thickness. If more than one coat is used, the surface should be allowed to dry thoroughly between coats. Upon evaporation of the volatile elements, a polymer copper matrix which is effective in deterring snails and slugs is formed.

While the invention has been described in connection with specific embodiments thereof, those skilled in the art will recognize that various modifications are possible within the principles described herein. Such modifications, variations, uses, or adaptations of the invention, including such departures from the present disclosure as come within known or customary practice in the art, and fall within the scope of the invention as defined by the appended claims.

We claim:

1. A method for forming a barrier material for excluding terrestrial gastropods, said method comprising (a) depositing a liquid suspension comprising from about 10 to about 75 weight percent polymeric material, from about 5 to about 80 weight percent particulate copper, and from about 10 to about 55 weight percent liquid carrier, on a supporting surface; and (b) allowing the liquid carrier to evaporate; wherein evaporation of the liquid carrier produces a material having from about 5 to about 95 weight percent polymeric material and from about 95 to about 5 weight percent particulate copper dispersed throughout said polymeric material, 2. A method of claim 1 wherein the polymeric material is selected from the group consisting of polyvinyl chloride, urethanes, polyethylenes, polypropylenes, polyesters, polystyrenes, and mixtures thereof.

3. A method of claim 1 wherein the supporting surface comprises a rigid substrate.

4. A method of claim 1 wherein the supporting surface comprises a flexible substrate.

5. A method of claim 1 wherein evaporation of the liquid carrier produces a material having from about 80 to about 95 weight percent polymeric material and from about 5 to about 20 weight percent particulate copper dispersed throughout said polymeric material.

* * * * *